United States Patent [19]

Morino et al.

[11] 4,160,429
[45] Jul. 10, 1979

[54] ELECTRONICALLY CONTROLLED FUEL INJECTION SYSTEM FOR INTERNAL COMBUSTION ENGINES

[75] Inventors: Seiji Morino, Okazaki; Hisasi Kawai, Toyohashi, both of Japan

[73] Assignee: Nippon Soken, Inc., Nishio, Japan

[21] Appl. No.: 812,597

[22] Filed: Jul. 1, 1977

[30] Foreign Application Priority Data

Aug. 8, 1976 [JP] Japan .................................. 51-94117

[51] Int. Cl.² .............................................. F02B 5/02
[52] U.S. Cl. .............................. 123/32 EB; 123/117 D
[58] Field of Search ........ 123/32 EA, 32 EB, 32 EC, 123/32 EF, 117 R, 117 D; 364/431

[56] References Cited

U.S. PATENT DOCUMENTS 3,986,006 10/1976 Kawai et al. ................. 123/32 EB X
4,034,720 7/1977 Noguchi et al. ............. 123/32 EB X Primary Examiner—Charles J. Myhre
Assistant Examiner—Tony M. Argenbright
Attorney, Agent, or Firm—Cushman, Darby & Cushman

[57] ABSTRACT

An electronically controlled fuel injection system in which terminating fuel injection is improved is disclosed. A reference position detector is adapted to generate a synchronizing signal at the predetermined angular position of an engine. A first computing circuit is connected to compute the required fuel injection interval in response to the synchronizing signal and a second computing circuit is connected to compute the rotation interval between two synchronizing signals successively generated. A further computing circuit is connected to compute the time interval which is equal to the difference between the rotation interval and the injection interval. The fuel injection is started when the time interval computed by the further computing circuit has passed after the generation of the synchronizing signal and is attained during the computed injection interval, whereby the fuel injection is terminated at the same position as the predetermined angular position.

5 Claims, 3 Drawing Figures

ELECTRONICALLY CONTROLLED FUEL INJECTION SYSTEM FOR INTERNAL COMBUSTION ENGINES

BACKGROUND OF THE INVENTION

1. Field of the Invention

The present invention relates to electronically controlled fuel injection systems for internal combustion engines which are designed so that the amount of fuel injected is controlled by the duration of fuel injection, and more particularly the invention relates to such fuel injection system wherein the time of fuel injection ending is improved to be substantially synchronized with a predetermined rotational angle of the engine.

2. Description of the Prior Art

In the past, there have been electronically controlled fuel injection systems in which the amount of fuel supplied to an internal combustion engine is controlled in accordance with the duration of fuel injection by the opening of fuel injectors, and in a system of this type the beginning of fuel injection is synchronized with a predetermined rotational angle of the engine crankshaft. Thus, if, for example, the beginning of fuel injection is synchronized with the beginning of the suction stroke in the case of a four-cycle internal combustion engine, the injection time per stroke will be reduced at high engine rotational speeds with the resulting danger of causing the fuel injection to extend over part of the following compression stroke. Thus, particularly in the case of an engine in which fuel is fed directly into the engine, there is a disadvantage that the high cylinder pressure causes insufficient injection of fuel. Also, in the case of a two-cycle internal combustion engine, there is a disadvantage that since the suction stroke and the scavenging stroke overlap each other, the injection of the fuel is continued even during the scavenging process, thus causing the emission of unburned gases.

SUMMARY OF THE INVENTION

With a view to overcoming the foregoing deficiencies, it is the object of this invention to provide an electronically controlled fuel injection system for internal combustion engines wherein the moment at which fuel injection is commenced is determined in accordance with the time required for the engine crankshaft to rotate through a predetermined angle and the duration of the fuel injection into the engine, and the fuel is injected and supplied for the required period of time, thus causing the injection of the fuel to end at a predetermined angular position of the crankshaft.

The system of this invention has among its great advantages the fact that since the injection of fuel can be caused to and at a desired rotational angle of the crankshaft, by suitably adjusting this crankshaft angular position, it is possible to especially effectively effect the injection of fuel into the cylinders of an internal combustion engine as well as the injection of fuel into the two-cycle internal combustion engines, and it is also possible to effectively effect the injection of fuel in the four-cycle internal combustion engines as well as the rotary-type internal combustion engines wherein the injection of the fuel is effected before a predetermined crank angle.

The above and other objects and many of the attendant advantages of this invention will be apparent from the following description taken in connection with the accompanying drawings.

DESCRIPTION OF THE PREFERRED EMBODIMENT

Figure 1:
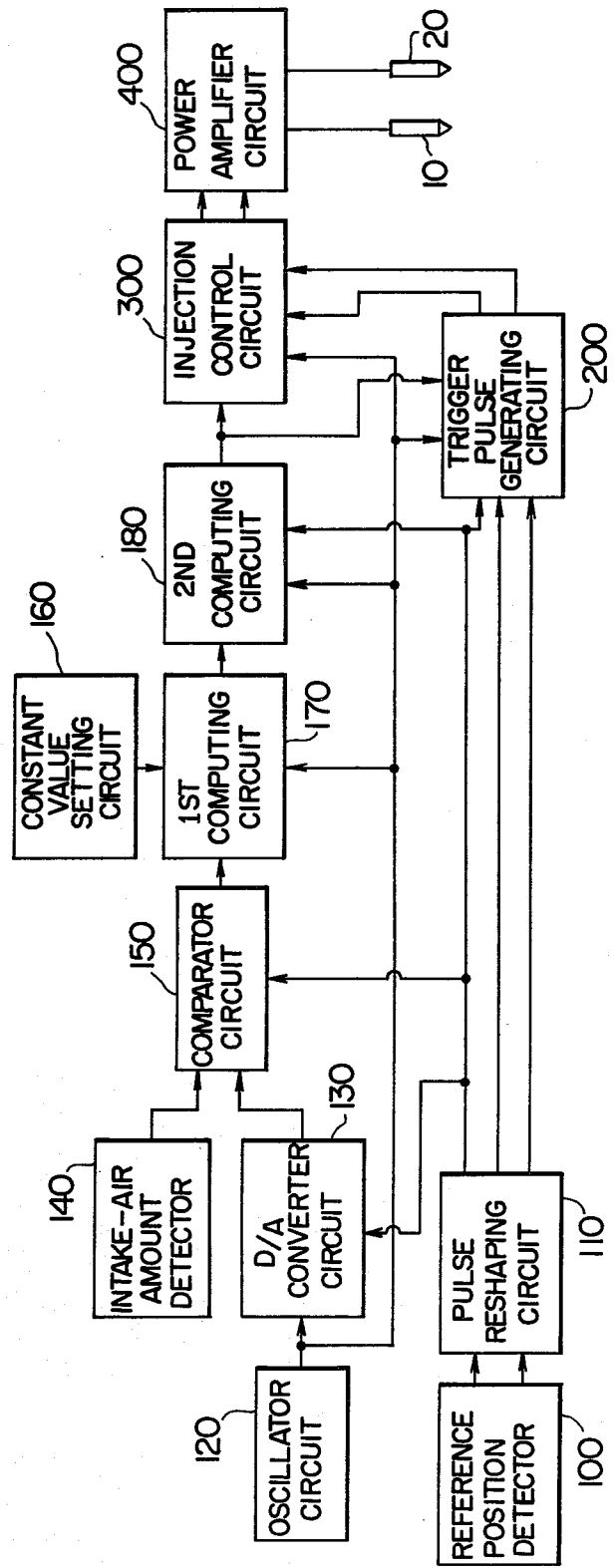
FIG. 1 is a block diagram showing the general construction of an embodiment of this invention.

The present invention will now be described with reference to the embodiment shown in the accompanying drawings. Referring to FIG. 1 showing the general construction of the embodiment, numeral 100 designates a reference position detector for generating a pulse signal or synchronizing signal per ½ revolution of the crankshaft in synchronism with predetermined angular positions of the crankshaft of a two-cylinder, two-cycle internal combustion engine which is not shown, 110 a pulse reshaping circuit for reshaping the waveform of the pulse signals generated from the reference position detector 100 and generating a pulse signal per ½ revolution of the crankshaft, 120 an oscillator circuit for generating clock pulses of a fixed frequency. Numeral 130 designates a D/A converter circuit for generating a voltage proportional to the number of pulses generated from the oscillator circuit 120, 140 an intake air amount detector disposed in the intake pipe of the engine to generate a voltage proportional to the amount of intake air Q, 150 a comparator circuit for comparing the voltage generated from the D/A converter circuit 130 with the voltage generated from the intake air amount detector 140 to generate a pulse signal having a time duration proportional to the amount of intake air Q per ½ crankshaft revolution, and the comparator circuit 150 generates such pulse signal for every ½ crankshaft revolution. Numeral 160 designates a constant value setting circuit for setting a constant K, 170 a first computing circuit for performing the binary multiplication of the output value of the constant value setting circuit 160 and the output value of the comparator circuit 150 to generate a binary coded output proportional to the value $K \times Q$, 180 a second computing circuit for computing the rotational speed N from the pulse signals generated by the pulse reshaping circuit 110 and performing the binary multiplication between the reciprocal 1/N of the rotational speed and the output value $K \times Q$ of the first computing circuit 170 to generate a binary coded signal, and the binary coded output generated from the second computing circuit 180 represents the product $K \times Q/N$. Numeral 200 designates a trigger pulse generating circuit for subtracting the output value $K \times Q/N$ of the second computing circuit 180 from the interval of the ½ crankshaft revolutions computed from the pulse signals from the pulse reshaping circuit 110 to generate a trigger signal. Numeral 300 designates an injection control circuit whereby in synchronism with the trigger signal from the trigger signal generating circuit 200 the output value $K \times Q/N$ of the second computing circuit 180 is proportionally converted into a pulse signal having a time duration to thereby control the fuel injection duration, 400 a power amplifier circuit for amplifying the pulse signal generated from the injection control circuit 300 and having a time duration indicative of the amount of fuel to be injected into the proper cylinder. Numerals 10 and 20 designate electromagnetically operated fuel injectors disposed for the respective cylinders.

Figure 2:
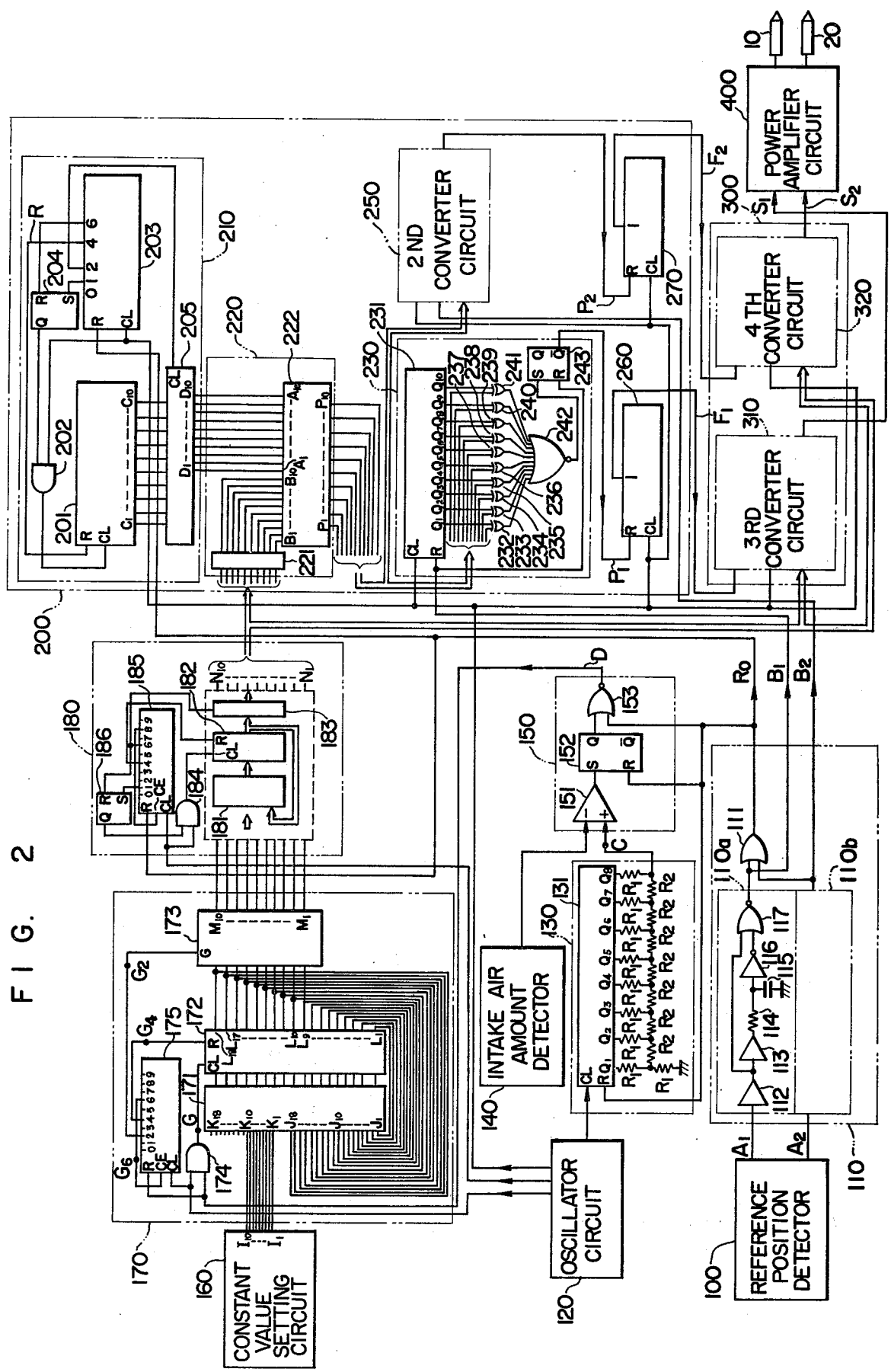
FIG. 2 is a wiring diagram showing a detailed construction of the embodiment shown in FIG. 1.
Figure 3:
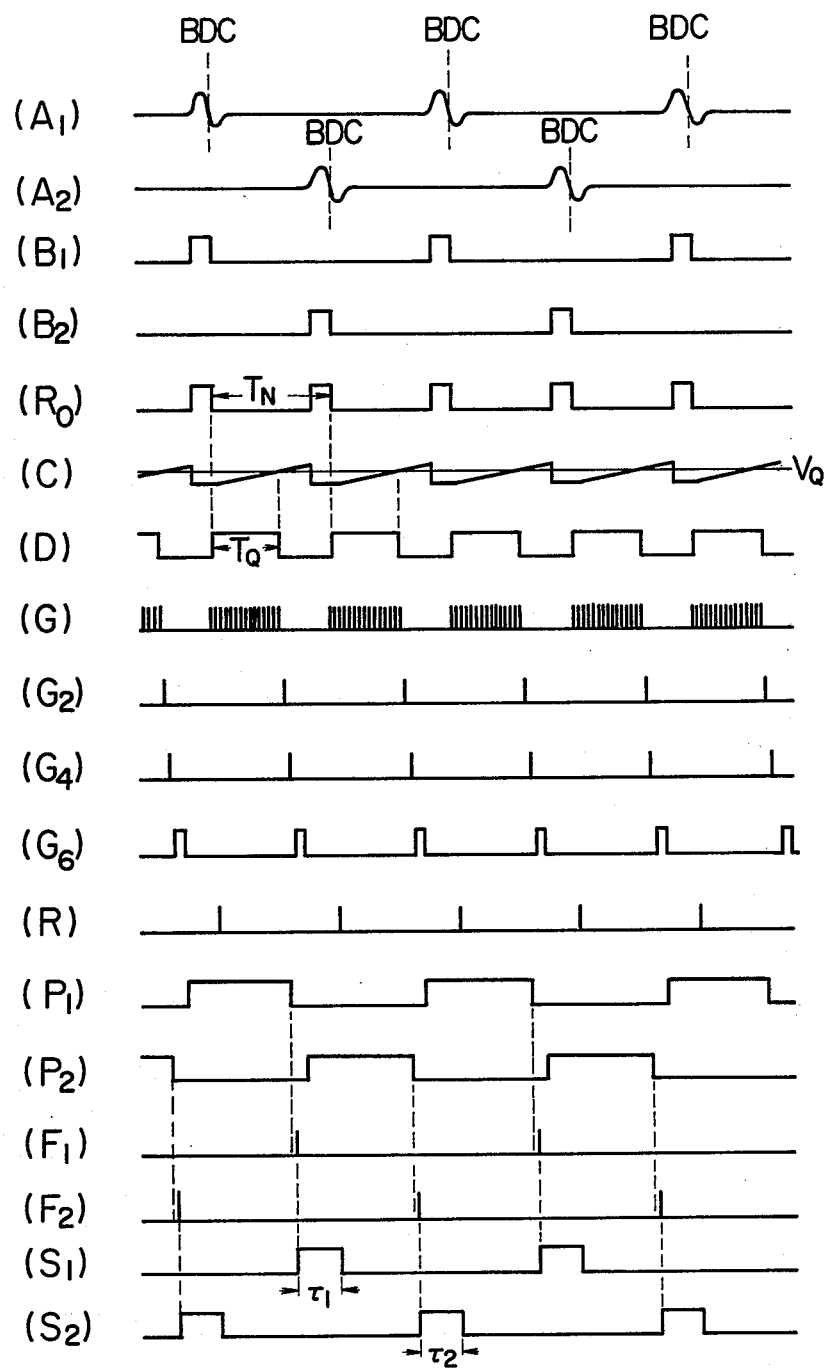
FIG. 3 is a signal waveform diagram useful in explaining the operation of the system of this invention.

Next, the detailed construction and operation of the individual circuits shown in FIG. 1 will be described with reference to FIGS. 2 and 3. Although not shown in detail, the reference position detector 100 may for example comprise a permanent magnet fixedly mounted on the rotary member of the ignition system distributor and a pair of winding cores arranged around the rotary member at equal intervals, whereby the pulse signals shown in ($A_1$) and ($A_2$) of FIG. 3 are generated at intervals of ½ crankshaft revolution. The synchronizing pulse signals $A_1$ and $A_2$ are respectively synchronized with the bottom dead center (BDC) of the crank of the first and second cylinders.

The pulse reshaping circuit 110 comprises pulse generating circuits 110a and 110b and an OR gate 111, and the pulse generating circuit 110a comprises a DC amplifier 112 (e.g., the Motorola IC MC3302P), a buffer 113, a resistor 114, a capacitor 115, an inverter 116 and a NOR gate 117. The other pulse generating circuit 110b is identical in construction with the pulse generating circuit 110a. The pulse signals $A_1$ and $A_2$ are amplified and reshaped by the pulse reshaping circuit 110 which in turn generates the pulse signals $B_1$ and $B_2$ shown in ($B_1$) and ($B_2$) of FIG. 3 and the reset signal $R_0$ shown in ($R_0$) of FIG. 3.

Although not shown in detail, the oscillator circuit 120 may comprise a known type of oscillator circuit employing a crystal unit so as to generate clock signals of a fixed frequency. The oscillator circuit 120 includes four frequency dividers so as to provide clock signals of four different frequencies.

The D/A converter circuit 130 comprises a binary counter 131 and a ladder-type resistor network of resistors having resistance values $R_1$ and $R_2$, respectively, whereby each time the binary counter 131 is reset by the reset signal $R_0$ generated by the pulse reshaping circuit 110, the binary counter 131 counts the clock signals applied from the oscillator circuit 120 and its count value is converted into a voltage by the ladder-type resistor network. Consequently, the D/A converter circuit 130 generates at its output terminal C a sawtooth voltage proportional to the time as shown in (C) of FIG. 3.

The comparator circuit 150 comprises a voltage comparator 151, an R-S flip-flop 152 and a NOR gate 153, and the comparator 151 compares the sawtooth voltage with the voltage $V_Q$ generated from the intake air amount detector 140 so that when the sawtooth voltage becomes higher than the voltage $V_Q$ proportional to the intake air amount Q, a "1" signal is generated and the R-S flip-flop 152 is set. In response to the reset signal $R_0$ and the Q output signal of the R-S flip-flop 152, the NOR gate 153 generates at its output terminal D the pulse signal D shown in (D) of FIG. 3. More specifically, this pulse signal D has a time duration $T_Q$ which is proportional to the intake air amount Q.

Although not shown in detail, the constant value setting circuit 160 is designed so that as for example, a constant for determining the air-fuel ratio and the rate of increase of the fuel injection amount corresponding to the engine cooling water temperature or the rate of increase of the fuel injection amount for acceleration or idling operation are computed to generate a binary coded output value "$I_{10}$, --- ---, $I_1$" corresponding to a constant K. Here, $I_n$ indicates the binary digit at the n-th digit position, and all binary coded values will hereinafter be indicated in the similar manner.

The first computing circuit 170 comprises a parallel adder 171 (e.g., the RCA IC CD4008), memories 172 and 173 (e.g., the RCA IC CD4035), an AND gate 174 and a decade divider/counter 175 (e.g., the RCA IC CD4017), and the memory 172 has its outputs "$L_{18}$, ---, $L_1$" feedback coupled to provide inputs "$J_{18}$, ---, $J_1$" to the parallel adder 171. The constant value setting circuit 160 applies its outputs "$I_{10}$, ---, $I_1$" to inputs "$K_{10}$, ---, $K_1$" of the parallel adder 171, and the decade divider/counter 175 is so designed that when it receives six clock signals, the counting of further clock signals is inhibited. Thus, when the pulse signal D having the time duration $T_Q$ is applied from the comparator circuit 150 to the AND gate 174, n clock signals from the oscillator circuit 120 are passed to an output terminal G of the AND gate 174 in proportion to the time duration $T_Q$ as shown in (G) of FIG. 3. After the output signal of the comparator circuit 150 has gone to "0", the decade divider/counter 175 counts the clock signals so that a "1" signal is generated at terminals $G_2$, $G_4$ and $G_6$, respectively, as shown in ($G_2$), ($G_4$) and ($G_6$) of FIG. 3 when the counter 175 counts the second, fourth and sixth clock signals, respectively. When the counter 175 counts the fourth clock signal, the memory 172 is reset and its outputs "$L_{18}$, ---, $L_1$" are reset to "0, ---, 0". Thereafter, in response to the application from the AND gate 174 of the clock signals shown in (G) of FIG. 3, the output "$L_{18}$, ---, $L_1$" of the memory 172 change to "$I_{10}$, ---, $I_1$", 2 × "$I_{10}$, ---, $I_1$," n × "$I_{10}$, ---, $I_1$." On the other hand, when the counter 175 counts the second clock signal, the memory 173 stores the higher ten digits of the output n × "$I_{10}$, ---, $I_1$" as "$M_{10}$, ---, $M_1$." In this case, since the number of clock pulses n is a value proportional to the intake air amount Q and the output "$I_{10}$, ---, $I_1$" represents a binary code indicative of the constant K, the first computing circuit 170 generates a binary coded output indicative of the product K × Q.

The second computing circuit 180 is identical in construction with the first computing circuit 170 except that it additionally includes an R-S flip-flop 186. The R-S flip-flop 186 is designed so that it generates at its Q output terminal a pulse signal having a time duration $T_N$ which is inversely proportional to the engine rotational speed N, and the application of the clock signals to a memory 182 through an AND gate 184 is inhibited in response to the occurrence of an input signal to a memory 183. With this second computing circuit 180, the output "$M_{10}$, ---, $M_1$" is added up as many times as the number of clock pulses m generated from the oscillator circuit 120 during the time duration $T_N$ corresponding to the reciprocal 1/N of the rotational speed N, and a binary coded output "$N_{10}$, ---, $N_1$" indicative of m × "$M_{10}$, ---, $M_1$" is generated as its output. Namely, the second computing circuit 180 performs multiplication K × Q/N.

The trigger pulse generating circuit 200 comprises a reference position pulse period counting circuit 210, a subtracting circuit 220, a first converter circuit 230, a second converter circuit 250, and decade dividers/counters 260 and 270. The reference position pulse period counting circuit 210 comprises a binary counter 201, a counter 203 which is identical in circuit construction with the decade divider/counter 185, an R-S flip-flop 204, an AND gate 202 and a memory 205, and the reference position pulse period corresponds to the time duration $T_N$ corresponding to the reciprocal of the engine rotational speed N. Each time the binary counter 201 is reset by the reset pulse R generated from the decade divider/counter 203 and shown in (R) of FIG. 3, the binary counter 201 counts the clock pulses applied from the oscillator circuit 120 through the AND gate 202 and its count value is generated as a binary coded output "$C_{10}, ---, C_1$" and stored in the memory 205 which in turn generates a binary coded output "$D_{10}, ---, D_1$." This binary coded output "$D_{10}, ---, D_1$" is inversely proportional to the engine rotational speed N since the AND gate 202 is allowed to pass the clock pulses during a predetermined constant interval. The subtracting circuit 220 comprises a parallel inverter 221 and a parallel adder 222, whereby the output value "$N_{10}, ---, N_1$" (the binary code corresponding to $K \times Q/N$) of the second computing circuit 180 is applied through the inverter 221 to inputs "$B_{10}, ---, B_1$" of the parallel adder 222 and the output value "$D_{10}, ---, D_1$" (the binary code corresponding to $T_N$) of the reference position pulse period counting circuit 210 is applied to inputs "$A_{10}, ---, A_1$" of the parallel adder 222. The parallel adder 222 performs the subtraction ($T_N - K \times Q/N$) and generates a binary coded output "$P_{10}, ---, P_1$" indicative of the subtraction result. The first converter circuit 230 comprises a binary counter 231, EXCLUSIVE OR gates 232 to 241, a NOR gate 242 and an R-S flip-flop 243. After the binary counter 231 and the R-S flip-flop 243 have been reset by the pulse signal $B_1$ from the pulse reshaping circuit 110, the binary counter 231 counts the clock pulses applied from the oscillator circuit 120. When the count value of the binary counter 231 becomes equal to the binary coded output "$P_{10}, ---, P_1$" of the subtracting circuit 220, the R-S flip-flop 243 is set. The R-S flip-flop 243 generates the pulse signal $P_1$ shown in ($P_1$) of FIG. 3 during the period from the time it is reset until it is set, and this time duration is proportional to the binary coded output or the difference value ($T_N - K \times Q/N$) from the subtracting circuit 220. The second converter circuit 250 is identical in circuit construction with the first converter circuit 230, and the pulse signal $B_2$ is applied from the pulse reshaping circuit 110 to the second converter circuit 250 thus causing it to generate the pulse signal $P_2$ shown in ($P_2$) of FIG. 3. The time duration of this pulse signal $P_2$ is also proportional to the output of the subtracting circuit 220. The decade divider/counter 260 is designed so that each time three clock signals are counted the counting of further clock signals is inhibited, and the trigger pulse signal $F_1$ shown in ($F_1$) of FIG. 3 is generated in response to the first clock signal applied after the counter 260 has been reset by the pulse signal $P_1$ from the first converter circuit 230. The decade divider/counter 270 is identical in circuit construction with the counter 260, and the trigger pulse signal $F_2$ shown in ($F_2$) of FIG. 3 is generated in response to the first clock signal applied after the counter 270 has been reset by the pulse signal $P_2$ from the second converter circuit 250.

The injection control circuit 300 comprises a third converter circuit 310 and a fourth converter circuit 320. The third converter circuit 310 is identical in circuit construction with the first converter circuit 230, and it receives as its reset signal the trigger pulse signal $F_1$ generated from the counter 260 and shown in ($F_1$) of FIG. 3 and as its binary coded input signal the binary coded output "$N_{10}, ---, N_1$" of the second computing circuit 180. Thus, the third converter circuit 310 generates as shown in ($S_1$) of FIG. 3 a pulse signal $S_1$ having a time duration $\tau_1$ in synchronism with the trigger pulse signal $F_1$. This time duration $\tau_1$ is proportional to the binary coded output "$N_{10}, ---, N_1$" or the output value $K \times Q/N$ of the second computing circuit 180, and this time duration determines the fuel injection duration $\tau_1$ for the first cylinder. The fourth converter circuit 320 is identical in circuit construction with the third converter circuit 310, and it receives as its reset signal the trigger pulse signal $F_2$ generated by the counter 270 and shown in ($F_2$) of FIG. 3 and as its binary coded input the binary coded output of the second computing circuit 180. Thus, the fourth converter circuit 320 generates as shown in ($S_2$) of FIG. 3 a pulse signal $S_2$ having a time duration $\tau_2$ in synchronism with the trigger pulse signal $F_2$. This time duration $\tau_2$ is also proportional to the output value $K \times Q/N$ of the second computing circuit 180 and it determines the fuel injection duration $\tau_2$ for the second cylinder.

The power amplifier circuit 400 is of a known type which amplifies the output pulse signals $S_1$ and $S_2$ of the injection control circuit 300, whereby through the power amplifier circuit 400, the fuel injector 10 for the first cylinder is opened for the duration $\tau_1$ of the injection signal $S_1$ shown in ($S_1$) of FIG. 3, and the fuel injector 20 for the second cylinder is opened for the duration $\tau_2$ of the injection signal $S_2$ shown in ($S_2$) of FIG. 3, thus injecting and supplying fuel under pressure to the engine which is not shown.

In the above-described operation, the pulse signals $B_1$ and $B_2$ respectively synchronized with the pulse signals $A_1$ and $A_2$ are respectively generated once every crankshaft revolution with a phase difference of a half period therebetween, and the reset signal $R_0$ is generated once every ½ crank-shaft revolution. However, the periods $T_N$ of the succeeding reset signals $R_0$ do not differ much from each other and remain practically the same. Thus, since the trigger pulse generating circuit 200 generates a trigger pulse signal at the expiration of a time corresponding to one period $T_N$ of the reset signals $R_0$ minus the fuel injection time $\tau$ after the generation of the reset pulse $R_0$, if the injection of fuel is commenced after the generation of the trigger pulse, the injection of the fuel can be ended practically at a predetermined crankshaft angular position. While the above-described embodiment is designed to compute digitally, the objects of the present invention can also be accomplished by one which computes analogically.

What is claimed is:

1. A fuel injection system for internal combustion engines comprising:
   an electromagnetic injector for injecting fuel into an internal combustion engine during the opening thereof;
   a reference position detector for generating a synchronizing signal at each time when the crankshaft of said engine rotates to a predetermined reference angular position;
   means, connected to said reference position detector, for computing an injection interval in response to said synchronizing signal, said injection period being varied in accordance with the operating conditions of said engine and indicative of the fuel injection amount;
   means, connected to said reference position detector, for computing a rotation interval between two said synchronizing signals successively generated by said reference position detector;
   a subtracting circuit means, connected to said means for computing the injection interval and said means for computing the rotation interval, for subtracting said injection interval from said rotation interval to thereby compute a differential interval therebetween;

a trigger circuit means, connected to said reference position detector and said subtracting circuit means, for generating a trigger signal when said differential interval passes after the generation of said synchronizing signal; and an injection control circuit means, connected to said means for computing the injection interval and said trigger circuit means, for opening said electromagnetic injector during said injection period in synchronism with said trigger signal, whereby start of fuel injection is varied in accordance with said operating conditions and termination of fuel injection is attained substantially at said predetermined reference angular position.

2. A fuel injection system according to claim 1, wherein said means for computing the injection interval includes digital means for generating a binary coded output signal proportional to said injection interval, wherein said means for computing the rotation interval includes digital means for generating a binary coded output signal proportional to said rotation interval, and wherein said subtracting circuit means includes inverting means for inverting said binary coded output signal of said means for computing the injection interval and adding means for adding said inverted binary coded signal and said binary coded output signal of said means for computing the rotation interval to thereby generate a binary coded output signal indicative of said differential interval.

3. A fuel injection system according to claim 2, wherein said trigger circuit means includes:

counting means for counting clock signals of a fixed frequency after the generation of said synchronizing signal and generating a binary coded output signal indicative of the count value thereof; and means for generating said trigger signal when said binary coded output signal of said counting means becomes equal to said binary coded output signal of said adding means.

4. A fuel injection system according to claim 3, wherein said injection control circuit means includes:

counting means for counting clock signals of a fixed frequency after the generation of said trigger signal and generating a binary coded output signal indicative of the count value thereof; and pulse generating means for generating a pulse signal from when said trigger signal is generated until when said binary coded output signal of said counting means included in said injection control circuit means becomes equal to said binary coded output signal of said means for computing the injection interval, whereby said pulse signal controls the opening duration of said electromagnetic injector.

5. A fuel injection system according to claim 1, wherein said means for computing the injection interval includes:

means for detecting the amount of air sucked into said engine;

means for detecting the rotational speed of said engine; and means for dividing said amount of air by said rotational speed to thereby compute said injection interval.

* * * * *